(12) United States Patent
Hehl

(10) Patent No.: US 6,835,061 B1
(45) Date of Patent: Dec. 28, 2004

(54) DEVICE AND METHOD FOR CARRYING OUT A TWO-STAGE LINEAR MOVEMENT

(76) Inventor: Karl Hehl, Arthur-Hehl-Strasse 32, D-72290 Lossburg (DE)

( * ) Notice: Subject to any disclaimer, the term of this patent is extended or adjusted under 35 U.S.C. 154(b) by 261 days.

(21) Appl. No.: 10/130,678

(22) PCT Filed: Nov. 21, 2000

(86) PCT No.: PCT/EP00/11581

§ 371 (c)(1),
(2), (4) Date: May 21, 2002

(87) PCT Pub. No.: WO01/38070

PCT Pub. Date: May 31, 2001

(30) Foreign Application Priority Data

Nov. 22, 1999  (DE) ......................................... 199 56 190

(51) Int. Cl.[7] ........................ B29C 45/68; B29C 33/22; B22D 17/26
(52) U.S. Cl. ...................... 425/590; 425/589; 425/593; 254/199
(58) Field of Search ............................. 425/590, 451.2, 425/451.7, 593, 589; 254/199

(56) References Cited

U.S. PATENT DOCUMENTS

| | | | |
|---|---|---|---|
| 4,797,086 A | * | 1/1989 | Adachi ....................... 425/589 |
| 5,345,766 A | * | 9/1994 | Leonhartsberger et al. ... 60/545 |
| 5,622,737 A | * | 4/1997 | Hehl .......................... 425/590 |

FOREIGN PATENT DOCUMENTS

| | | |
|---|---|---|
| DE | 19536565 | 3/1997 |
| DE | 195 42 453 | 5/1997 |
| EP | 0674985 | 4/1995 |
| JP | 4332616 | 11/1992 |
| JP | 09029802 | 2/1997 |
| WO | 09211993 | 7/1992 |

* cited by examiner

Primary Examiner—Kathy Matecki
Assistant Examiner—Evan Langdon
(74) Attorney, Agent, or Firm—Cantor Colburn LLP

(57) ABSTRACT

A device for carrying out a two-stage, linear movement as well as an associated method for displacing a displaceable structural unit relative to a stationary structural unit. A first drive unit drives a shaft, which is in operative connection with a tube, which is connected to the displaceable structural unit. If a predeterminable condition is substantially achieved, a switch is made from the first drive unit to a second drive unit. Because the tube extends through the stationary structural unit and is displaced relative to the stationary structural unit when the first drive unit is actuated, the at least one separating means being jointly displaceable with the second drive unit and coupling in a detachable manner the tube to the second drive unit initially when the condition is achieved and thereby separating the shaft from the flow of force, as soon as the second drive unit is actuated alone, the members, which transfer the rotary movement into a straight movement, can be protected in a two-stage linear movement.

24 Claims, 6 Drawing Sheets

US 6,835,061 B1

DEVICE AND METHOD FOR CARRYING OUT A TWO-STAGE LINEAR MOVEMENT

FIELD OF THE INVENTION

Figure 1:
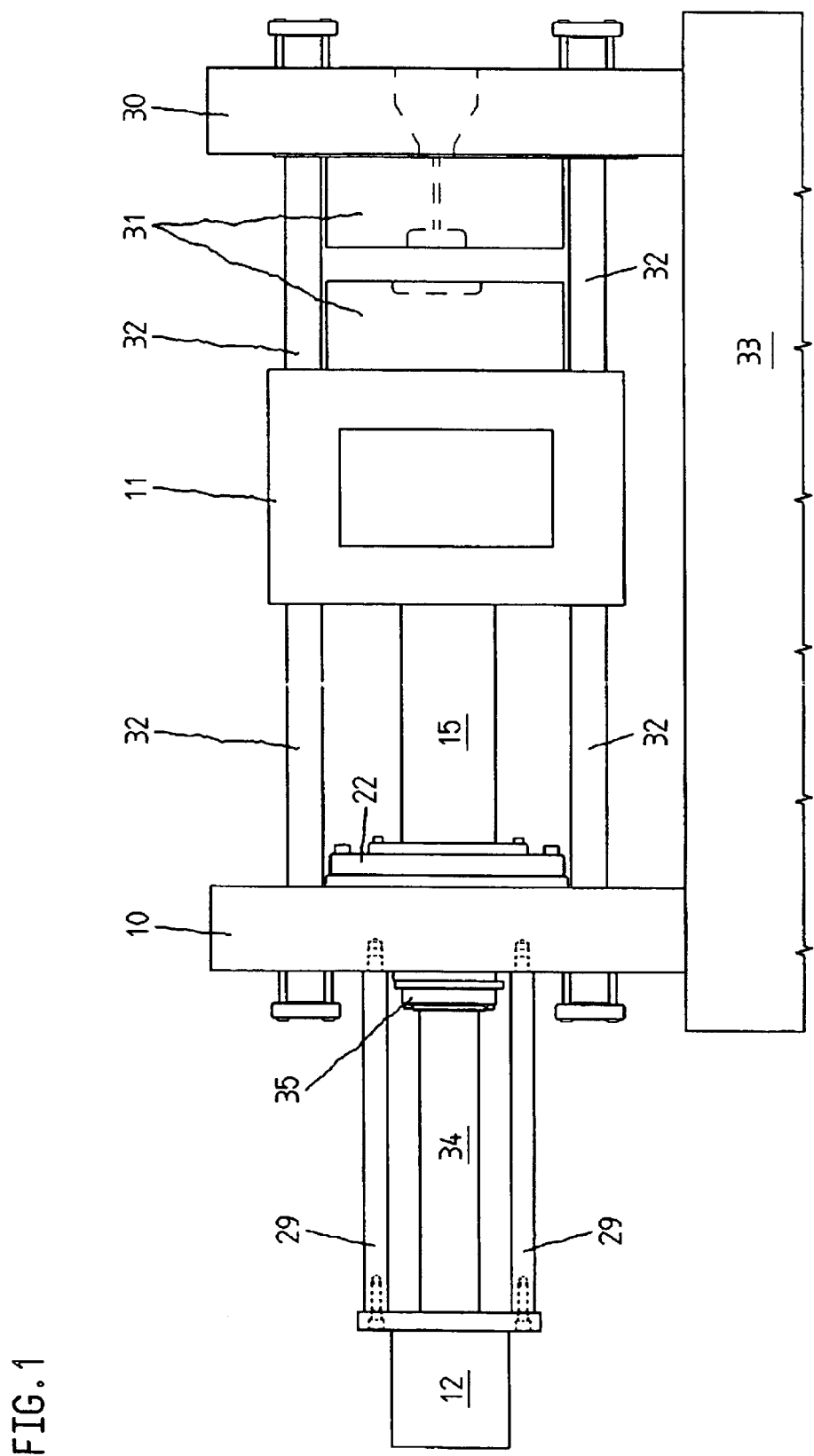

The invention relates to a device for carrying out a substantially two-stage linear movement, which is usable preferably, but not only, on a plastics injection molding machine.

STATE OF THE ART

A device of this type is known from DE 195 42 453 C2. A shaft with a head with external thread lies in a tube with internal thread. Cylinder or rolling bodies in the form of planets are preferably disposed between shaft and tube, are mounted so as to be non displaceable axially relative to the head and are in operative connection with the two threads of head and tube. Another tube is disposed around the shaft so as to be nor-displaceable relative to this latter and, when the electromechanical unit is displaced, moves into the tube, which is provided with the internal thread, and moves out of the same. The shaft is mounted via cup springs in such a manner that when the shaft is actuated via a first drive unit, it can move just until a greater force is applied, e.g. via a second drive unit. Consequently, the shaft can, where applicable, be separated from the flow of force and the forces are transmitted via the two interlocking tubes, a gradual transfer from the one drive unit to the other is not possible.

Japanese Patent Application JP-A 9-29802 shows a two-stage closing mechanism, where the traveling motion is initially effected via a threaded shaft with a small diameter, whilst the applying of the closing force is then effected via a threaded shaft with a large diameter. The small shaft, to this end, engages via a thread in the large shaft in a coaxial manner. During the traveling motion a nut, which is in operative connection with the external thread of the threaded shaft with the larger diameter, is entrained in a passive manner. When the closing force is to be applied, a sleeve is impinged upon hydraulically, whereby a gap between nut and sleeve is initially closed. With further movement, the nut is pressed by the sleeve into a position, in which the closing force can be applied and the shaft is blocked. Through the thread, however, the point of contact alters depending on the position in such a manner that the result is variable from injection cycle to injection cycle.

Japanese Patent Application JP-A 4-332616, for the traveling motion when the molds are run together, has a ball roller spindle, which plunges into the piston rod of a closing cylinder with the mold in the opened state. For actuating the piston rod of the closing cylinder, there is a ball roller nut disposed at its end, which ball roller nut interacts with the ball roller spindle. To relieve the ball roller spindle, which is not designed for the closing forces, and to apply the closing force, there is an adjusting mechanism provided which is designed so as to be spline-like. On the mold-side end of the closing cylinder and on the end of the closing piston remote from the mold, there are projections provided which slide past one another during the mold closing movement, but which on the other hand are also for transferring the mold forces from the closing cylinder to the closing piston. Consequently, via corresponding auxiliary means, the parts of this locking mechanism are rotated in such a manner that the closing force can then be applied by dosing the gap d. This is also dependent on the position and varies from cycle to cycle.

DE 195 36 565 A1 makes known an electromechanical drive, where also the parts of a threaded rolling planetary spindle are secured via securing means, such as, for example, springs, against passive reversing. There is a two-stage movement, however the rolling bodies are continuously in the flow of force. The second drive unit is not actuated until the first drive unit is secured.

The series closing of the mold of an injection molding machine is known, for example, in EP 0 674 985 A1, where forces are directed both when the displaceable mold carrier is moving to form closure and when the holding force is applied constantly via spindles, which are to be dimensioned accordingly.

WO 92/11993 A1 makes known providing a hydraulic piston cylinder unit with a plunger piston, which at the same time is in operative connection with a threaded spindle. There are no means provided for the effective separating of the threaded spindle from the flow of force.

SUMMARY OF THE INVENTION

Proceeding from the state of the art, it is the object of the present invention, in the case of a substantially two-stage linear motional action, to protect the members, which transmit the rotary movement for achieving the straight movement.

This object is achieved through a device for carrying out a substantially two-stage linear movement comprising: a stationary structural unit; a displaceable structural unit; at least one first electromechanical drive unit mounted on the stationary structural unit; at least one shaft rotatably driven by the first drive unit and having a region with an external thread; at least one tube with an internal thread, which tube is disposed coaxially relative to the respective shaft, is displaced with the displaceable structural unit and is in operative connection with the external thread for the displacement of the displaceable structural unit; separating means for a separation of the shaft at least from a further flow of force when at least one predeterminable condition is obtained, the predeterminable condition includes a translatory position of the tube and a predeterminable axial force; and at least one second drive unit, which is actuatable once the predeterminable condition has been achieved, wherein the tube extends through the stationary structural unit and is displaced relative to the stationary structural unit when the first drive unit is actuated, the separating means being jointly displaceable with the second drive unit and, when the predeterminable condition is achieved, the tube is firstly coupled in a detachable manner to the second drive unit and in so doing separates the shaft at least from the further flow of force, which is produced by the second drive unit, as soon as the second drive unit is actuated alone, and that the separating means works radially on the tube.

This object is also achieved through a method for performing a substantially two-stage, linear movement, the method comprising: actuating a shaft by means of at least a first electromechanical drive unit until a predeterminable condition is obtained, the first electromechanical drive unit is mounted on a stationary structural unit; separating the shaft at least from the further flow of force, when the predeterminable condition is achieved, by separating means that work radially on the tube; actuating at least a second drive unit once the predeterminable condition has been achieved, for the displacement of the displaceable structural unit via the tube, which is disposed coaxially relative to the respective shaft, which is displaced with the displaceable structural unit and is in operative connection with the shaft;

and displacing the tube relative to the stationary structural unit when the first drive unit is actuated, the separating means being jointly displaceable with the second drive unit and, when the predeterminable condition is achieved, the tube is firstly coupled in a detachable manner to the second drive unit and in doing so separates the shaft at least from the further flow of force produced by the second drive unit, as soon as the second drive unit is actuated alone.

The tube, which has the internal thread, is preferably disposed in such a manner that, on account of the actuation of the first drive unit, the tube is not only displaced relative to the stationary structural unit but also extends through this unit. At the same time, separating means, which are displaceable jointly with the second drive unit, are disposed in such a manner for the separation, where applicable, of the shaft of this first drive unit from the flow of force that, for example, a free movement is possible during the actuation of the first drive unit. However, as soon as, preferably, a predetermined limiting condition occurs, the first drive unit, with the exception of the tube transmitting the forces, can be released. Consequently, the parts of the electromechanical drive unit, which are in operative connection with one another via the threads (head of the shaft, rolling bodies), or alternatively a linear motor forming the first drive unit, are not exposed to the forces from the second drive unit and can accordingly be dimensioned for the transfer of smaller forces. Costly self-locking threads on the electromechanical drive unit are not necessary.

SHORT DESCRIPTION OF THE FIGURES

Figure 2:
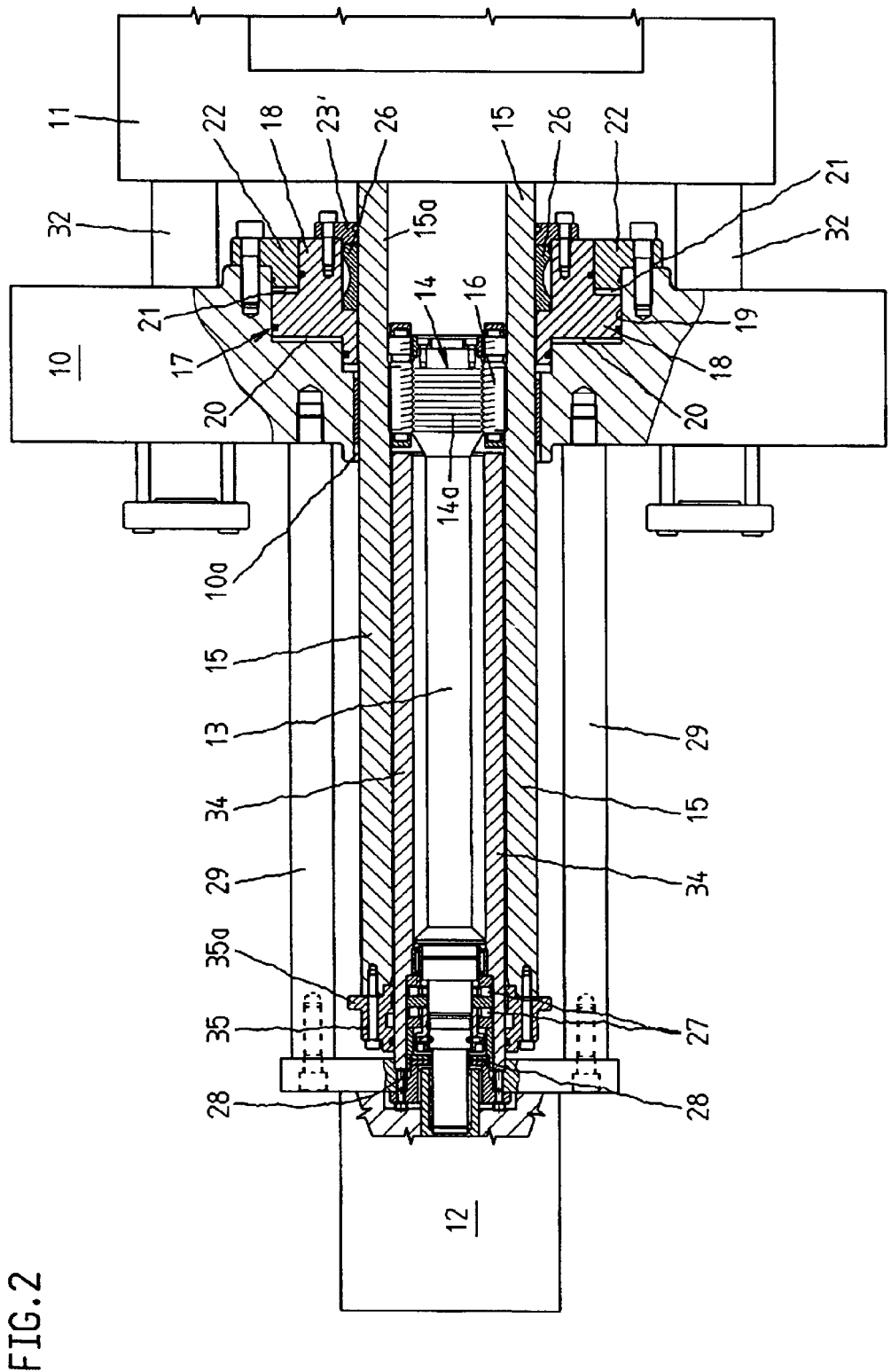
Figure 3:
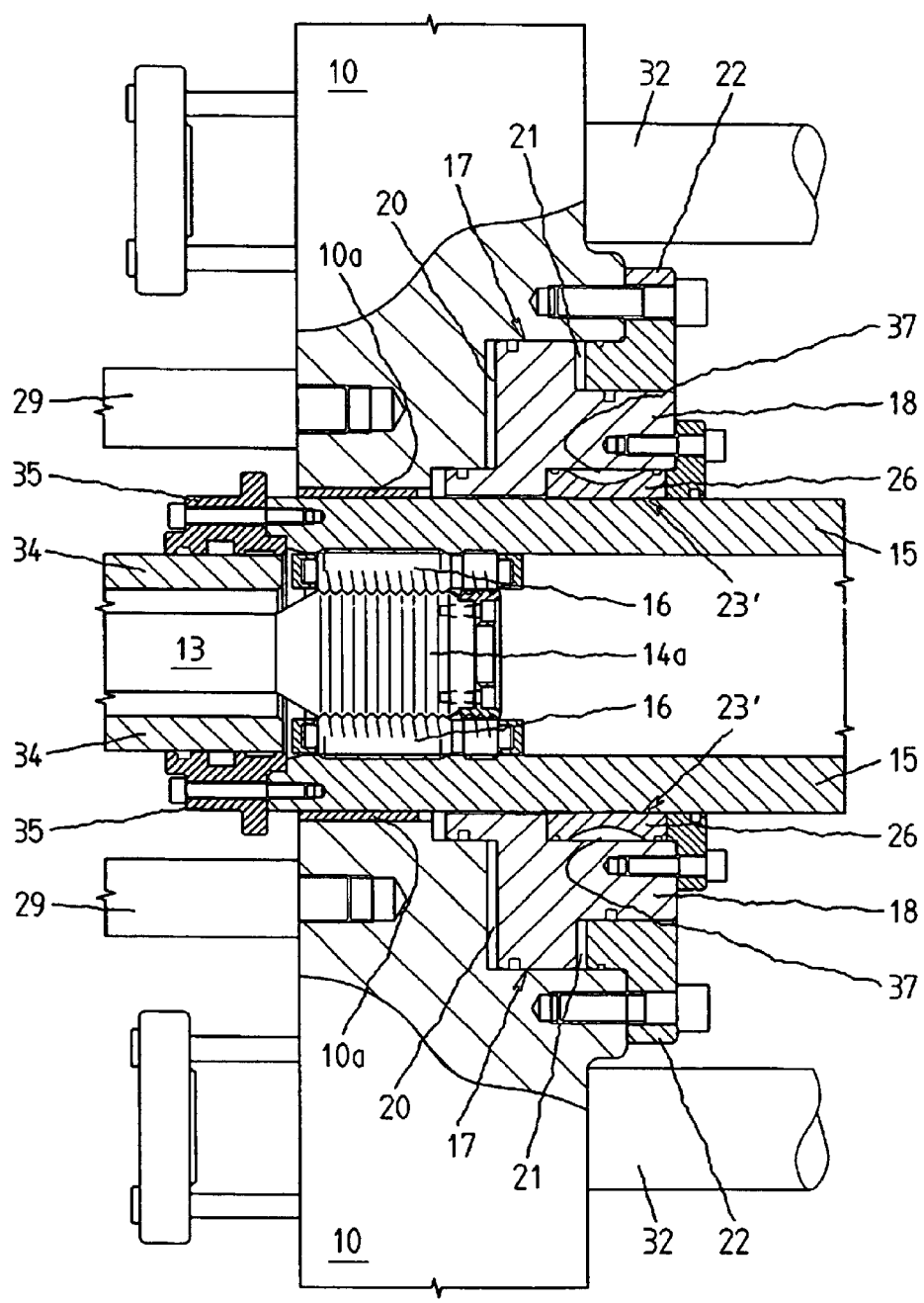
Figure 5:
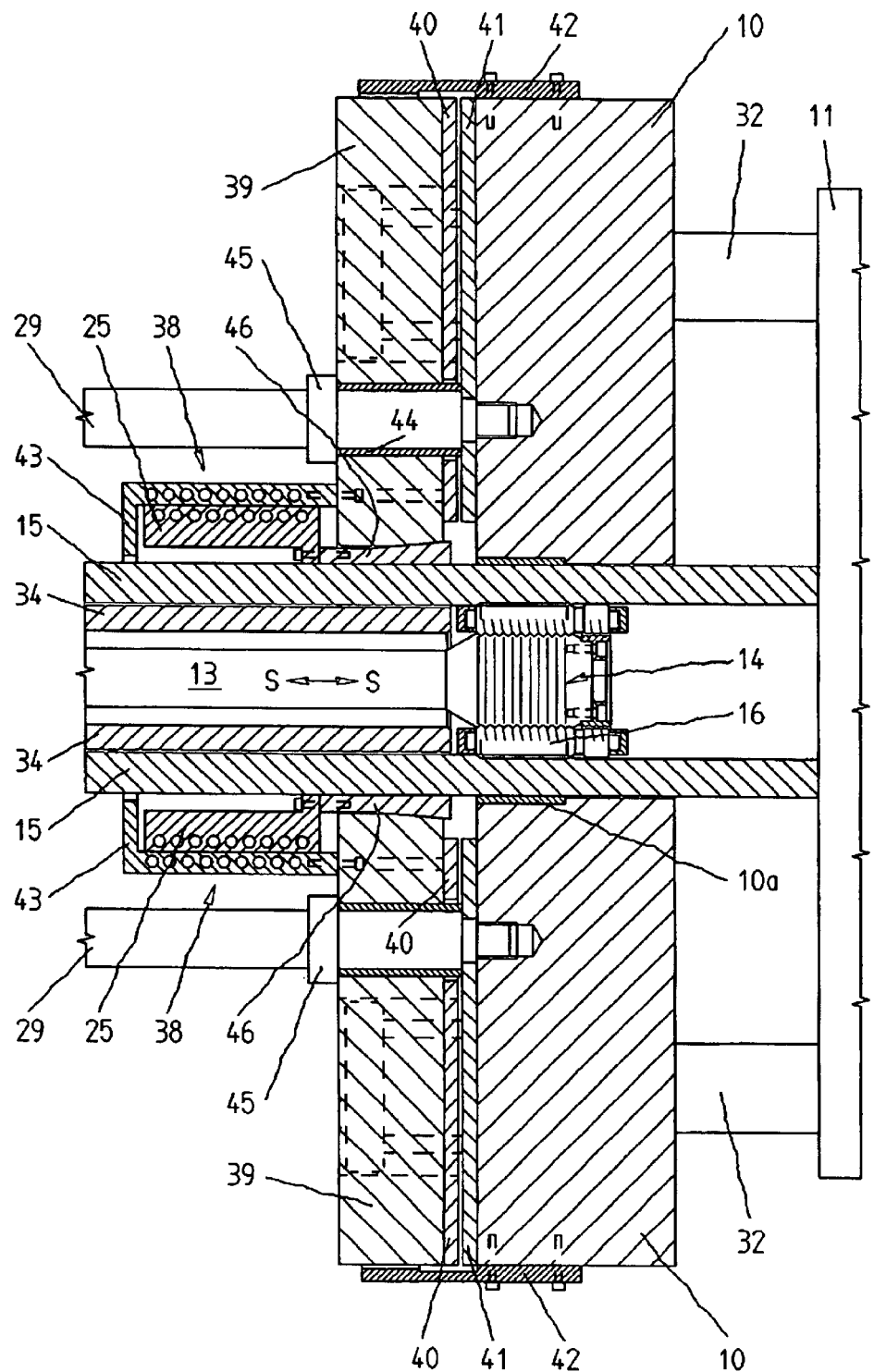
Figure 6:
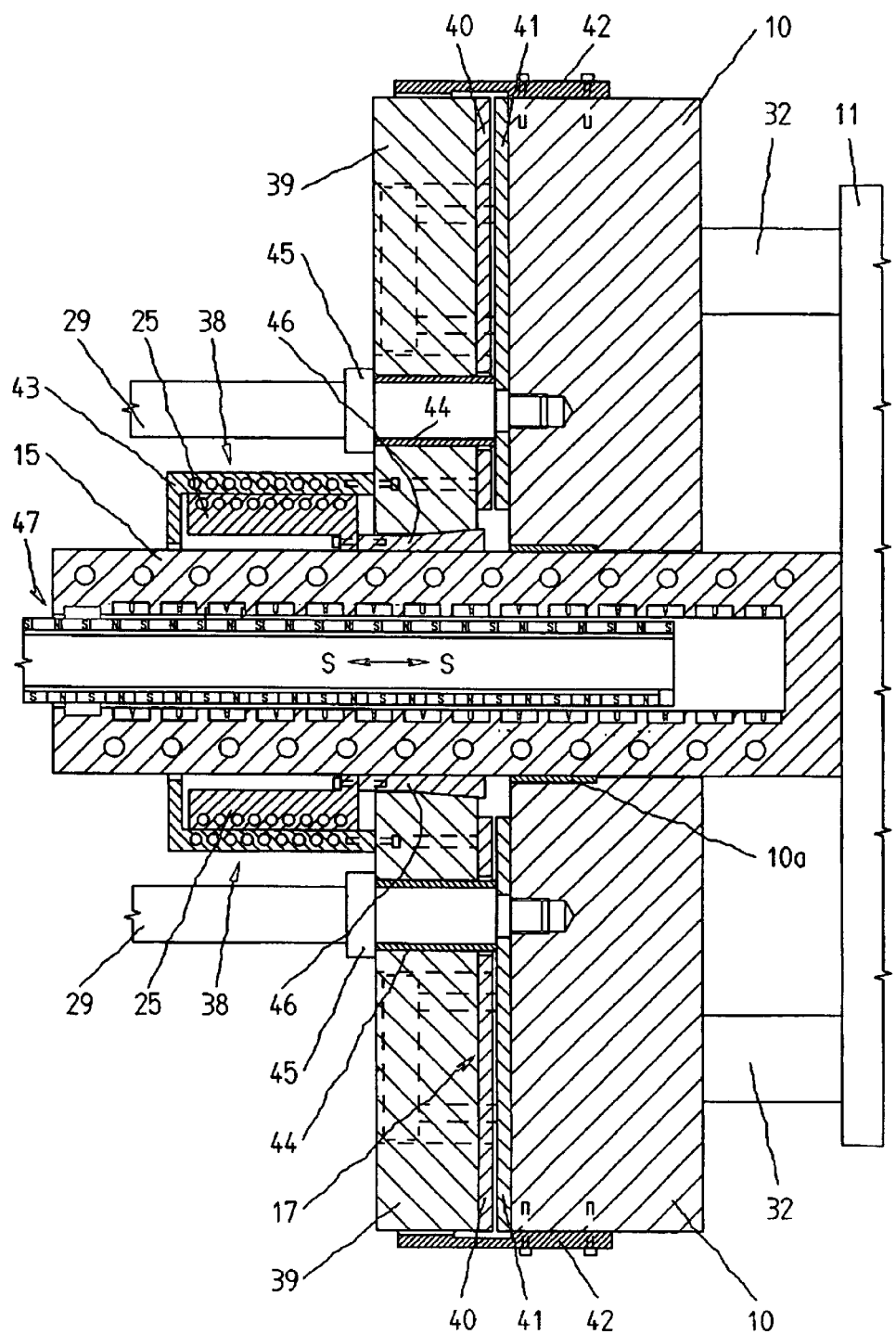

The invention is explained below by way of the exemplified embodiments represented in the Figures. In which:

FIG. 1 is a front view of a closing unit situated on a machine base,

FIG. 2 is an enlarged, partially sectioned cut-out from FIG. 1 in the region of the stationary structural unit with opened tool, FIG. 3, 4 are enlarged cut-outs from FIG. 2 in the region of the stationary structural unit in two exemplified embodiments of hydraulic separating means, FIG. 5 is a representation as in FIG. 2 with a magnetically actuatable second drive unit, FIG. 6 is a representation as in FIG. 5 with a linear motor as first drive unit.

DETAILED DESCRIPTION

The invention is now described in more detail as an example with reference to the enclosed drawings. The exemplified embodiments are, however, only examples, which are not to restrict the inventive concept to any specific arrangement.

The Figures show a device for carrying out a substantially two-stage, linear movement on a plastics material injection molding machine, which is suitable for processing plastics materials and other plasticizable substances such as powdery substances or ceramic substances. Although the device is explained below on this injection molding machine, it can certainly be used in general for a two-stage linear movement of machine parts, such as, for example, with machine tools and robots. If it is important for some machines to carry out movements rapidly, strong forces are more important to other machines. In the case of plastic injection molding machines, for example, the requirements for the closing unit in FIG. 1 change during the displacement procedure. Thus, when the mold 31 is closed, the displaceable mold carrier, as displaceable structural unit 11, is to be closed as rapidly as possible initially at a predetermined speed profile using little force, whilst during the further closing movement, a strong holding force is necessary.

FIG. 1 shows the design of a mold closing unit, which is disposed on a machine base 33. The mold closing unit has a supporting member as stationary structural unit 10 and a stationary mold carrier 30. Stationary mold carrier 30 and stationary structural unit 10 are interconnected via braces or tie bars, which act as guiding means on one hand of the displaceable structural unit 11 (displaceable mold carrier) and at the same time are configured as force transmitting members for transmitting the forces occurring during the injection molding process.

The closing movement or respectively the actual supplying of the mold is effected via a first electromechanical drive unit 12, which is mounted on the stationary structural unit 10. The further movement or respectively the applying of the holding force is effected through the use of a second hydraulic drive unit 17 as in FIGS. 2 and 3.

As shown in FIGS. 2 and 3, the electromechanical drive unit 12 has a rotatably driven shaft 13, which is mounted on the drive unit 12 via a bearing arrangement 27. The shaft 13, in its turn, has a region with external thread 14a, in the exemplified embodiment the head 14. The shaft 13, itself, is displaced in a rotary manner and is fixed so as to be substantially non-displaceable axially when the first drive unit is actuated in the direction of the shaft. The only axial movement is allowed through the cup springs 28, which are to be explained subsequently.

An internal thread 15a of a tube 15 is in operative connection with the external thread 14a of the head 14. This tube 15 is displaced jointly with the displaceable structural unit 11 and is disposed coaxially relative to the shaft 13. Although this is not necessary in principle, for simplifying the rotary movement, cylinder or rolling bodies 16, which are retained opposite the shaft 13 between the shaft 13 and the tube 15 so as to be non displaceable in the axial direction of the shaft, are disposed in the form of planets. If the shaft 13 is rotated, the head 14 with its external thread 14a sets the planets in rotation such that there is an axial movement of the tube 15 on account of the engagement of these planets in the internal thread 15a of the tube 15. According to FIGS. 2 and 3, the tube 15 is disposed in such a manner that it extends through the stationary structural unit 10 and, on account of the actuation of the first drive unit 12, is displaced relative to this stationary structural unit 10. The drive units are preferably disposed in such a manner that the electromechanical drive unit 12 is situated at a fixed spacing from the stationary structural unit 10, whilst the second drive unit 17 is disposed on the stationary structural unit. The successful friction-locking of the tube 15 makes it possible in a simple manner for the annular piston 18 of the second drive unit 17 to be able to work directly on the tube 15 for the transferring of further forces.

If a predeterminable condition is achieved, which, for example, can be a specific translatory position of the tube 15 (e.g. a position just in front of a mold closure in the case of a plastic injection molding machine in order to carry out a subsequent injection embossing process) or the achieving of a predeterminable axial force, the shaft 13 is disengaged through separating means 23, 23', 38, where applicable, at least from the further flow of force, but also, where applicable, from all flow of force. The further application of force and/or movement is effected substantially via a second drive unit 17 once this predetermined condition has been achieved. This predetermined condition, however, can include a plurality of individual conditions if, for example, the two drive units are actuated jointly over a certain period what is explained below.

The separating means 23, 23', 38 for the separating of the shaft, where applicable, are disposed on the stationary structural unit 10 so as to be jointly displaceable with the second drive unit 17. When the predeterminable condition has be en achieved, these fix the tube 15 directly or indirectly to the stationary structural unit 10 in a detachable manner. At the same time, the separating means 23, 23', 38 connect the tube initially for joint displacement in a detachable manner to the second drive unit 17. At the same time, this prepares the separation of the shaft 13 from at least the further flow of force. As soon as namely the second drive unit 17 is actuated alone, the shaft 13 is released. A complete separation is not necessary here. It suffices if the further forces, which are applied by the second drive unit 17, remain substantially without further influence on those members which up to now have been in the flow of force of the first drive unit, these members, however, still continuing to be under the influence of the previous forces. In this case, there is a force superposition with no effect on these members. As can be seen in FIGS. 1 and 2, the first drive unit 12 is mounted via connecting means 29 on the side of the stationary structural unit 10, which is remote from the displaceable structural unit 11. This means that, in principle, the position of the head 14 no longer alters relative to the stationary structural unit. The shaft 13 is surrounded by another tube 34 such that with the axial movement of the tube 15 and also on account of the closing member 35, the compressing of a piston cylinder unit is produced externally, the "piston" withdrawing from the "cylinder". Permanent lubrication for the first drive unit can be applied in the interior in this way.

The separating means 23, 23', 38 lock the tube 15 in a friction-locking manner and where only one tube is used in a central manner, as soon as, in the case of the injection molding machine, for example, the mold closure has been achieved and a corresponding signal is given in order to act upon the hydraulic separating means 23, 23', 38, in the exemplified embodiment, by bringing hydraulic media into the cylinder areas 36, 37. This means that the separating means, where applicable, are actively actuatable at any time, without a certain external force having first to be active. In this respect, for example, in the case of injection embossing using a plastics injection molding machine, a change can be made at an arbitrary moment from one drive unit to the other independent of the respective forces.

As can be seen in FIG. 2, the second drive unit 17 has as piston an annular piston 18, which surrounds the tube 15 in a coaxial manner. The cylinder for this piston 18 is formed by a recess 19 in the stationary structural unit 10. The cylinder areas 20, 21 are defined in the axial direction of the tube 15 by the base 19a of the recess 19 as well as by an annular flange 22. The separating means 23, 23', 38 are disposed on the displaceable portion of the second drive unit, for example, on the annular piston 18 or on an intermediate element 39 independently in such a manner that once the separating means 23, 23', 38 have been actuated, an impingement of the annular piston 18 or a displacement of the intermediate element 39 results in the tube 15 also being displaced axially with annular piston or intermediate element. In the closing process, pressure is applied to the cylinder area 20, in the opening process pressure can be applied to the cylinder area 21, but this is not urgently necessary as purely through the abating of the pressure in the cylinder area 20, a return movement is set up such that, after releasing the locking through the separating means 23, 23' 38, the continued movement can be effected through the first drive unit 12, in the case of an injection molding machine as opening movement of mold 31.

The arrangement of the separating means on the second drive unit consequently also makes it possible to actuate the first electromechanical drive unit 12 and the hydraulic second drive unit 17 simultaneously at least part time to achieve a superposing movement. In this way, for a example, on an injection molding machine during the injection embossing process, that is injecting into the mold gap, which is still open, before the final mold closure, the first drive unit 12 can still be actuated, whilst the second drive unit is already in operation. It is especially advantageous, however, that this makes it possible to transfer the load for a transition period gradually from the first drive unit to the other and vice versa. In this respect only a substantially two-stage linear movement exists, as between the two stages both drive units are actuated during a period of transition. Through the superposing of the two movements, which consequently follows, a seamless, jerk-free transition can be effected easier than before. In this position, however, the one predeterminable condition becomes at least two predeterminable conditions. As soon as namely one condition is achieved, the separating means 23, 23', 38 are actuated. The second drive unit 17 is then connected, however with the first drive unit 12 not yet being disconnected until a further condition is achieved. However, the continued movement is taken over substantially by the second drive unit 17 in such a manner that it can be said that one predetermined condition is substantially achieved.

Figure 4:
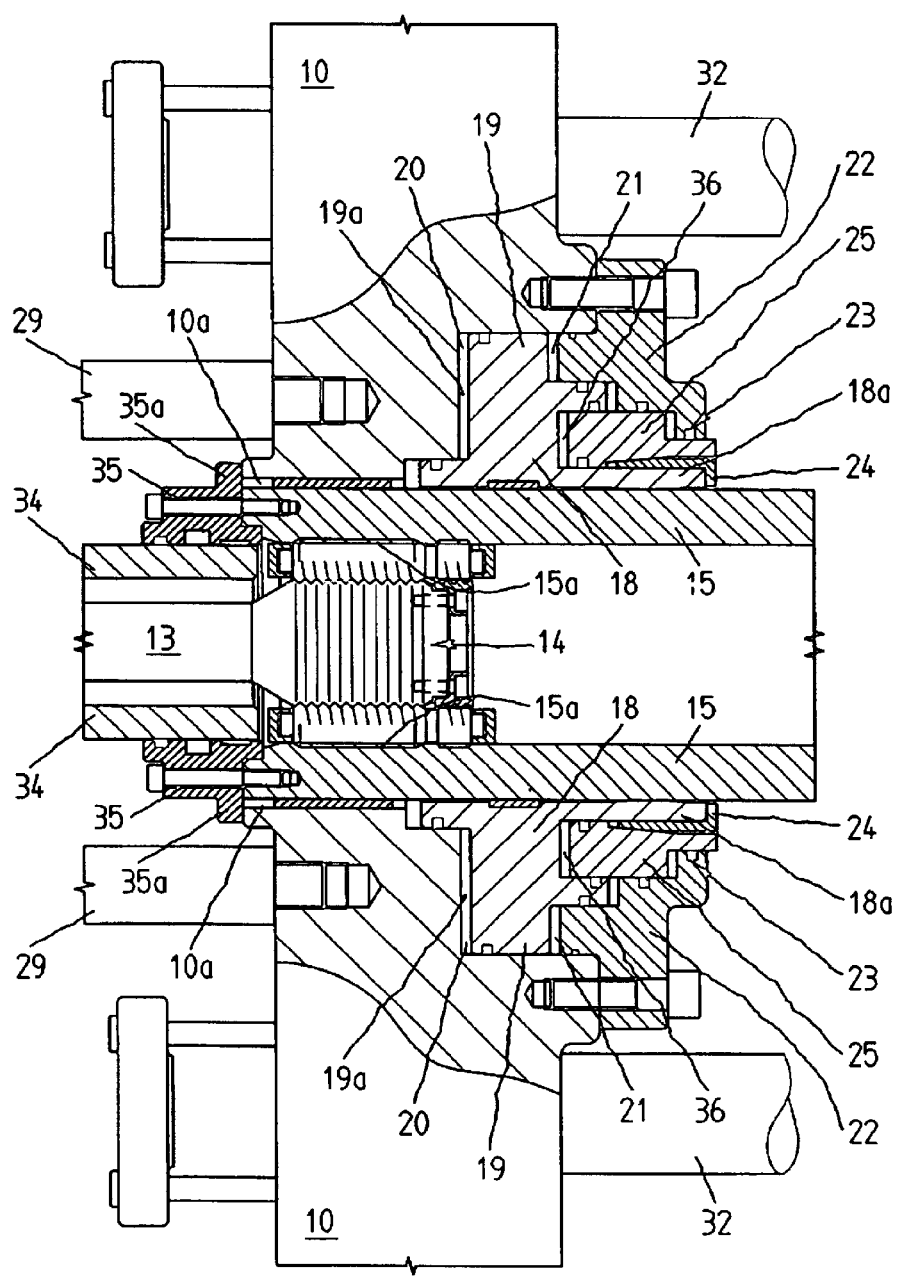

FIG. 4 shows a first embodiment of the separating means 23 in the form of a hydraulic tension clamp. In this embodiment, the annular piston 18 has a flange 18a, which extends along the tube 15. This flange can itself have a cone. In the embodiment, a collet 24 with cone is mounted on this flange 18a. To form the tension clamp, this cone interacts with a counter cone of another annular piston 25, which in its turn is mounted on the first annular piston 22. If, in the case of this exemplified embodiment, the predeterminable condition for switching between the first drive unit and another drive unit or for connecting the second drive unit 17 is achieved, by applying a pressure to the cylinder area 36, the other annular piston 25 in FIG. 4 is initially moved to the right. This tensions the two cones of the other annular piston 25 and the collet 24 together such that the tube 15 is frictionally tensioned. The annular piston 18 can then be moved jointly with the tube 15 through pressure build-up in the cylinder area 20 of the second drive unit 17.

As an alternative, FIG. 3 shows a hydraulic clamping sleeve 26 as separating means 23'. In this case, pressure is applied to the cylinder area 37 as soon as the predeterminable condition is achieved and this results in frictional tensioning between tube 15 and annular piston 18.

As can be seen in FIG. 2, the shaft 13 is supported in a resilient manner via cup springs 28 on the first drive unit 12. Without this type of resilient cushioning, there would be a danger that when the second drive unit is actuated and the flow of force is from the tube via the separating means 23, 23', 38 and the annular piston 18 to the stationary structural unit, there would be a relative movement between stationary structural unit and tube, which would stress the rolling or cylinder bodies 16 and the shaft 13. To avoid this and to protect the rolling or cylinder bodies as much as possible, the cup springs 28 are provided in the region of the bearing arrangement 27. The cup springs 28 can also work as damping members in the case of the abovementioned superposed movement, as the torque of the first drive unit 12 can be restricted. If there are no cup springs 28, the drive unit 12 can also have a torque restricting means as an alternative.

To ensure that when the tube 15 and the annular piston 18 are tensioned, as little force as possible is transferred to the rolling and cylinder bodies 16 and the head 14, the first drive unit 12 is supported on the stationary structural unit 10 via the connecting means 29 in such a manner that the head 14 of the shaft 13, which head 14 has the external thread 14a, comes to lie in the opening 10a of the stationary structural unit 19, but is axially spaced from the separating means 23, 23' in the axial direction of the tube. The arrangement of the head 14 inside the opening 10a of the stationary structural unit is advantageous as, as can be seen when comparing FIG. 2 and FIG. 3, the tube 15 can be displaced to the right in FIG. 2 when the first drive unit is actuated until, as in FIG. 3, the stop member 35a of the cover 35 abuts the stationary structural unit.

The design of the device for carrying out a two-stage, linear movement has been explained up to now by way of one tube with one shaft and one electromechanical drive unit. In principle, it is possible to arrange a plurality of these devices in parallel. The advantage of the solution with only one tube and one drive unit is that a central clamping procedure is possible without there being any danger that, with a plurality of clamping procedures being effected parallel to one another, the individual devices are no longer parallel. When using only a simple clamping procedure, there are no more synchronization problems. Nevertheless, a plurality of these devices is also usable one next to the other.

FIGS. 5 and 6 show other embodiments, where the second drive unit 17 is actuatable in a magnetic manner. When actuated once the condition is achieved, the separating means 38 fix the tube 15 to an intermediate member 39, which is disposed on the stationary structural unit 10. The intermediate member 39, which is configured as a support plate, can itself be magnetic or magnetically actuatable or can have a magnetic plate 40, as in FIG. 5. The stationary structural unit can also be provided with a magnetic plate 41. Consequently, the intermediate member 39 can be moved jointly with the tube 15 at least through the intermediary of the magnetic attractive forces produced by the second drive unit 17 for the application of the closing force in the direction of closure s-s. The movement is effected within a cover 42.

The magnetic plates 40, 41 correspond to one another such that the area available in conjunction with the spacing between the magnetic plates when connecting the second drive unit determines the magnetic forces available. Consequently, the intermediate member 39 in its dimensions in the horizontal projection in the direction of closure s-s is preferably approximately as large as the stationary structural unit 10. With this type of design, it is possible to apply the closing force magnetically through the second drive unit 17. As the magnetic force increases exponentially as the spacing between the magnetic plates decreases, it easily generates a high closure force. For opening and, where applicable, pulling apart the mold, only the polarity has to be changed so that the first drive unit is not loaded with additional forces.

As can be seen in FIGS. 5 and 6, the connecting means 29 act as guiding means to the intermediate member 39 via friction bearing 44. The movement of the intermediate member is defined by stop members 45. As can be seen in FIG. 6, the first drive unit 12 can also be an electromagnetically operated linear motor 47, a portion of which is formed by the linear displacing means 15, whilst the enclosed stator, as in the case of the electromechanical drive unit, is supported by the connecting members 29 on the stationary structural unit 10. The at least one separating means 38 locks the linear displacing means 15 in a frictional manner, for example in a hydraulic manner. The separating means 38 can also be actuated through the intermediary of a linear motor.

As can be seen in FIGS. 5 and 6, the separating means 38 work as a tension clamp. An annular piston 25, for example, can be moved hydraulically or magnetically in closing direction s-s in a housing 43, which is disposed coaxially relative to the tube 34. An annular sleeve 46 with cone is connected to the annular piston. This cone interacts with a counter cone on the intermediate member 39 to form the tension clamp. If the predeterminable condition is achieved in the case of this embodiment, the annular piston 25 as in FIGS. 5 and 6 is initially displaced to the left. This makes the two cones of the annular piston 25 and of the intermediate member 39 tension together such that the tube 15 is frictionally tensioned. The intermediate member 39 can then be moved jointly with the tube 15 through the magnetic forces of the second drive unit 17.

The device operates, for example, as follows. Initially the driving member of at least a first drive unit 12, which is mounted on the stationary structural unit 10, is actuated until the predeterminable condition is achieved. The driving member is then separated from the flow of force through the intermediary of the separating means 23, 23', 38, when achieving the predeterminable condition, as far as necessary. The further movement is effected at least substantially through actuation of at least a second drive unit 17 substantially after achieving the predeterminable condition for the displacement of the displaceable structural unit 11. To this end at least one tube 15, which is displaced with the displaceable structural unit 11, is in operative connection with the shaft 13. When the first drive unit 12 is displaced, the tube 15 is displaced relative to the stationary structural unit 10. It actually slides through the stationary structural unit 10. When the condition is achieved, the separating means 23, 23', 38, disposed on the stationary structural unit 10, locks or clamps the tube 15 in a detachable and preferably frictional manner. The separating means 23, 23' can be actively connected through impingement of the associated cylinder areas 36, 37 or can be actively connected in a magnetic manner. To achieve a superposing movement, the first drive unit 12 and the second drive unit 17 can be actuated simultaneously at least part-time.

This description can be subject to the most varied modifications, alterations and adaptations, which range in the region of equivalents to the attached sub claims. Moreover, the present application claims priority to German patent application 199 56 190.7, filed on Nov. 22, 1999, the content of that disclosure of which is herein incorporated by reference in its entirety.

What is claimed is:

1. Device for carrying out a substantially two-stage linear movement comprising:

a stationary structural unit;

a displaceable structural unit;

at least one first electromechanical drive unit mounted on the stationary structural unit;

at least one shaft rotatably driven by the first drive unit and having a region with external thread;

at least one tube with internal thread, which tube is disposed coaxially relative to the respective shaft, is displaced with the displaceable structural unit and is in operative connection with the external thread for the displacement of the displaceable structural unit;

separating means for a separation of the shaft at least from a further flow of force when at least one predeterminable condition is obtained, the predeterminable condition includes at least one of a translatory position of the tube and a predeterminable axial force;

at least one second drive unit, which is actuatable once the predeterminable condition has been achieved, wherein the tube extends through the stationary structural unit and is displaced relative to the stationary structural unit when the first drive unit is actuated, the separating means being jointly displaceable with the second drive unit and, when the predeterminable condition is achieved, the tube is firstly coupled in a detachable manner to the second drive unit and in so doing separates the shaft at least from the further flow of force, which is produced by the second drive unit, as soon as the second drive unit is actuated alone, and that the separating means works radially on the tube.

2. Device according to claim 1, wherein the separating means is actively actuatable through impingement of associated cylinder areas.

3. Device according to claim 1, wherein the separating means is actively actuatable in a magnetic manner.

4. Device according to claim 1, wherein the separating means friction-lock the tube in a central manner once the predetermined condition has been obtained.

5. Device according to claim 1, wherein the second hydraulic drive unit has as piston a rotary piston that surrounds the tube coaxially and a cylinder of which is formed through a recess in the stationary structural unit.

6. Device according to claim 5, wherein the cylinder areas of the second drive unit are defined in a direction of the rotary piston by a base of the recess and by an annular flange, which is mounted on the stationary structural unit.

7. Device according to claim 1, wherein to obtain a superposed displacement, the first drive unit and the second drive unit are actuatable simultaneously at least at times.

8. Device according to claim 1, wherein the separating means is configured as a hydraulically or magnetically actuatable tension clamp.

9. Device according to claim 1, wherein the separating means is configured as a hydraulically or magnetically actuatable tension clamp, wherein the second hydraulic drive unit has a first rotary piston, and wherein the tension clamp is formed by a collet having a first cone that interacts with a second cone of a second rotary piston, the second rotary piston is mounted in the first rotary piston, the collet is mounted on a flange of the second rotary piston and the flange extends along the tube.

10. Device according to claim 1, wherein the separating means is formed by a hydraulic clamping sleeve.

11. Device according to claim 1, wherein a mounting of the shaft is supported on the first drive unit in a resilient manner via cup springs.

12. Device according to claim 1, wherein the first drive unit is supported on a side of the stationary structural unit remote from the displaceable structural unit.

13. Device according to claim 1, wherein the first drive unit is supported on the stationary structural unit via connecting means in such a manner that a head of the shaft, which bears the external thread, is disposed approximately in an opening of the stationary structural unit.

14. Device according to claim 13, wherein the separating means, which work radially on the tube, is at a spacing from the head in the axial direction of the tube.

15. Device according to claim 1, wherein the stationary structural unit is a supporting member of a substantially two-stage, linear closing unit on a plastics injection molding machine and the displaceable structural unit is the displaceable mold carrier of a plastics injection molding machine.

16. Device according to claim 1, wherein the first drive unit is a portion of a magnetically operated linear motor being in operative connection with the tube.

17. Device according to claim 1, wherein the separating means, when actuated once the predeterminable condition has been obtained, secure the tube to an intermediate member and in that the intermediate member is displaceable in a closing direction at least by means or magnetic attractive forces produced by the second drive unit to provide a closing force in the closing direction (s-s).

18. Method for performing a substantially two-stage, linear movement, the method comprising:

actuating a shaft by means of at least of a first electromechanical drive unit until a predeterminable condition is obtained, the first electromechanical drive unit is mounted on a stationary structural unit;

separating the shaft at least from the further flow of force, when the predeterminable condition is achieved, by separating means that work radially on the tube;

actuating at least a second drive unit once the predeterminable condition has been achieved, for a displacement of the displaceable structural unit via at the tube, which is disposed coaxially relative to the respective shaft, which is displaced with the displaceable structural unit and is in operative connection with the shaft; and displacing the tube relative to the stationary structural unit when the first drive unit is actuated, the separating means being jointly displaceable with the second drive unit, and when the predeterminable condition is achieved, the tube is firstly coupled in a detachable manner to the second drive unit and in doing so separates the shaft at least from the further flow of force produced by the second drive unit, as soon as the second drive unit is actuated alone.

19. Method according to claim 18, wherein the separating means is actively connected through impingement of associated cylinder areas or respectively is actively connected in a magnetic manner.

20. Method according to claim 18, wherein the separating means friction-lock the tube in a central manner once the predeterminable condition is achieved.

21. Method according to claim 18, wherein to obtain a superposed displacement, the first drive unit and the second drive unit are actuated simultaneously at least at times.

22. Device according to claim 1, further comprising rolling bodies disposed between the shaft and the tube and retained so as to be non-displaceable in an axial manner opposite the shaft.

23. Device for carrying out a substantially two-stage linear movement comprising:

a stationary structural unit;

a displaceable structural unit;

at least one shaft having a region with external thread;

at least one first drive unit mounted on the stationary structural unit, the first drive unit produces a force on the shaft so that the shaft is rotatably driven by the first drive unit;

at least one tube with internal thread, which tube is disposed coaxially relative to the shaft, is displaced with the displaceable structural unit and is in operative connection with the external thread for the displacement of the displaceable structural unit;

separating means for a separation of the shaft at least from a further flow of force when at least one predeterminable condition is obtained, the predeterminable condition includes at least one of a translatory position of the tube and a predeterminable axial force;

at least one second drive unit, which is actuatable once the predeterminable condition has been achieved, wherein the tube extends through the stationary structural unit and is displaced relative to the stationary structural unit when the first drive unit is actuated, the separating means being jointly displaceable with the second drive unit and, when the predeterminable condition is achieved, the tube is firstly coupled in a detachable manner to the second drive unit and in so doing separates the shaft at least from the further flow of force, which is produced by the second drive unit, as soon as the second drive unit is actuated alone, and that the separating means works radially on the tube.

24. Device for carrying out a substantially two-stage linear movement comprising:

a stationary structural unit;

a displaceable structural unit;

at least one first electromechanical drive unit mounted on the stationary structural unit;

at least one shaft rotatably driven by the first drive unit and having a region with external thread;

at least one tube with internal thread, which tube is disposed coaxially relative to the respective shaft, is displaced with the displaceable structural unit and is in operative connection with the external thread for the displacement of the displaceable structural unit;

separating means for a separation of the shaft at least from a further flow of force when at least one predeterminable condition is obtained, the predeterminable condition includes at least one of a translatory position of the tube and a predeterminable axial force;

at least one second drive unit, which is actuatable once the predeterminable condition has been achieved, wherein the tube extends through the stationary structural unit and is displaced relative to the stationary structural unit when the first drive unit is actuated, the separating means being jointly displaceable with the second drive unit and, when the predeterminable condition is achieved, the tube is firstly coupled in a detachable manner to the second drive unit and in so doing separates the shaft at least from the further flow of force, which is produced by the second drive unit, as soon as the second drive unit is actuated alone, and that the separating means works radially on the tube, and wherein the separating means is configured as a hydraulically or magnetically actuatable tension clamp and wherein the separating means is formed by a hydraulic clamping sleeve.

* * * * *